US009864573B2

(12) United States Patent
Tull

(10) Patent No.: US 9,864,573 B2
(45) Date of Patent: Jan. 9, 2018

(54) PERSONAL AUDIO MIXER

(71) Applicant: PowerChord Group Limited, Exeter, Devon (GB)

(72) Inventor: Graham Tull, Exeter (GB)

(73) Assignee: POWERCHORD GROUP LIMITED, Exeter (GB)

( * ) Notice: Subject to any disclaimer, the term of this patent is extended or adjusted under 35 U.S.C. 154(b) by 0 days.

(21) Appl. No.: 15/049,393

(22) Filed: Feb. 22, 2016

(65) Prior Publication Data

US 2017/0017461 A1    Jan. 19, 2017

(30) Foreign Application Priority Data

Jul. 16, 2015   (GB) .................................. 1512457.1

(51) Int. Cl.
| | | |
|---|---|---|
| G06F 3/16 | (2006.01) | |
| H04H 60/04 | (2008.01) | |
| H04R 3/12 | (2006.01) | |
| H04R 27/00 | (2006.01) | |
| H04S 3/00 | (2006.01) | |

(52) U.S. Cl.
CPC .............. G06F 3/165 (2013.01); G06F 3/162 (2013.01); H04H 60/04 (2013.01); H04R 3/12 (2013.01); H04R 27/00 (2013.01); H04S 3/002 (2013.01); H04R 2227/007 (2013.01); H04R 2420/01 (2013.01); H04R 2430/01 (2013.01); H04R 2430/03 (2013.01); H04S 2400/13 (2013.01); H04S 2400/15 (2013.01)

(58) Field of Classification Search
CPC ........... H04S 7/30; H04S 3/008; H04R 1/403; G01H 7/00; H04H 60/04; H03G 3/3089; G06F 3/165
USPC ....... 381/161, 310, 58, 107, 303, 17; 700/94
See application file for complete search history.

(56) References Cited

U.S. PATENT DOCUMENTS

| | | |
|---|---|---|
| 5,822,440 A | 10/1998 | Oltman et al. |
| 7,995,770 B1 | 8/2011 | Simon |
| 8,588,432 B1 | 11/2013 | Simon |
| 9,411,882 B2 * | 8/2016 | Cory .......................... H04S 7/30 |
| 2003/0007648 A1 * | 1/2003 | Currell ...................... H04S 7/30 |
| | | 381/61 |

(Continued)

FOREIGN PATENT DOCUMENTS

| | | |
|---|---|---|
| CN | 2904481 Y | 5/2007 |
| DE | 10 2008 033599 A1 | 1/2010 |

(Continued)

OTHER PUBLICATIONS

Internatioal Search Report dated Oct. 13, 2015 issued in corresponding United Kingdom Application No. GB1512450.6.

(Continued)

*Primary Examiner* — Mohammad Islam
(74) *Attorney, Agent, or Firm* — Morris & Kamlay LLP

(57) ABSTRACT

An audio mixer is provided comprising: an audio receiver configured to receive an audio signal comprising a plurality of audio channels and a controller comprising one or more modules configured to: receive an audio content setting from a user interface device, adjust the relative volumes of the audio channels according to the audio content setting to provide a plurality of adjusted audio channels and combine the adjusted audio channels to generate a custom audio content.

21 Claims, 3 Drawing Sheets

(56) References Cited

U.S. PATENT DOCUMENTS

| | | | |
|---|---|---|---|
| 2003/0063760 A1 | 4/2003 | Cresci et al. | |
| 2007/0269062 A1* | 11/2007 | Rodigast | H04R 1/403 381/310 |
| 2008/0071402 A1 | 3/2008 | Igoe | |
| 2009/0220104 A1 | 9/2009 | Allison | |
| 2010/0150359 A1* | 6/2010 | KnicKrehm | G01H 7/00 381/58 |
| 2012/0059492 A1* | 3/2012 | Radford | H04H 60/04 700/94 |
| 2012/0087507 A1 | 4/2012 | Meyer | |
| 2012/0195445 A1 | 8/2012 | Inlow | |
| 2012/0288121 A1* | 11/2012 | Matsui | H03G 3/3089 381/107 |
| 2014/0133683 A1* | 5/2014 | Robinson | H04S 3/008 381/303 |
| 2014/0328485 A1* | 11/2014 | Saulters | G06F 3/165 381/17 |

FOREIGN PATENT DOCUMENTS

| | | |
|---|---|---|
| EP | 2007045 A2 | 12/2008 |
| EP | 2658209 A2 | 10/2013 |
| GB | 2436193 A | 9/2007 |
| WO | WO-94/04010 A1 | 2/1994 |
| WO | WO-2006/049370 A1 | 5/2006 |
| WO | WO-2013/083133 A1 | 6/2013 |

OTHER PUBLICATIONS

International Search Report dated Oct. 19, 2015 issued in corresponding United Kingdon Patent Application No. 1512444.9.

Combined International Search and Examination Report dated Jan. 29, 2016 issued in corresponding United Kingdom Patent Application No. 1512457.1.

International Search Report and Written Opinion for PCT/GB2016/052142 dated Oct. 5, 2015.

International Search Report and Written Opinion for PCT/GB2016/052139 dated Oct. 10, 2016.

International Search Report and Written Opinion for PCT/GB2016/0521326 dated Oct. 20, 2016.

Office Action dated Aug. 22, 2017 as received in GB Application No. 1512457.1.

* cited by examiner

PERSONAL AUDIO MIXER

CROSS-REFERENCE TO RELATED APPLICATIONS

This application claims the benefit and priority of United Kingdom Patent Application No. 1512457.1 filed on Jul. 16, 2015. The entire disclosure of the above application is incorporated herein by reference.

The subject application includes subject matter similar to U.S. patent application Ser. No. 15/049,342, entitled "Synchronising an Audio Signal", filed concurrently herewith; and U.S. patent application Ser. No. 15/049,349, entitled "A Method of Augmenting an Audio Content", filed concurrently herewith; both of which are incorporated herein by reference.

FIELD

The present disclosure relates to a personal audio mixer.

BACKGROUND

Music concerts and other live events are increasingly being held in large venues such as stadiums, arenas and large outdoor spaces such as parks. With increasingly large venues being used, the challenge of providing a consistently enjoyable audio experience to all attendees at the event, regardless of their location within the venue, is becoming increasingly challenging.

All attendees at such events expect to experience a high quality of sound, which is either heard directly from the acts performing on the stage, or reproduced from speaker systems at the venue. Multiple speaker systems distributed around the venue may often be desirable to provide a consistent sound quality and volume for all audience members. In larger venues, the sound reproduced from speakers further from the stage may be delayed such that attendees, who are standing close to distant speakers, do not experience an echo or reverb effect as sound from speakers nearer the stage reaches them.

In some cases such systems may be unreliable and reproduction of the sound may be distorted due to interference between the sound produced by different speaker systems around the venue. Additionally, if multiple instrumentalists and/or vocalists are performing simultaneously on the stage, it may be very challenging to ensure the mix of sound being projected throughout the venue is correctly balanced in all areas to allow the individual instruments and/or vocalists to be heard by each of the audience members. Catering for all the individual preferences of the attendees in this regard may be impossible.

SUMMARY

According to an aspect of the present disclosure, there is provided an audio mixer comprising: an audio receiver configured to receive an audio signal comprising a plurality of audio channels using a first wireless communication system; and a controller configured to: receive an audio content setting from a user interface device separate from the audio mixer; adjust the relative volumes of the audio channels according to the audio content setting to provide a plurality of adjusted audio channels; and combine the adjusted audio channels to generate a custom audio content.

According to another aspect of the present disclosure, there is provided an audio mixer comprising: an audio receiver configured to receive an audio signal comprising a plurality of audio channels; and a controller configured to: receive an audio content setting from a user interface device; adjust the relative volumes of the audio channels according to the audio content setting to provide a plurality of adjusted audio channels; and combine the adjusted audio channels to generate a custom audio content.

The controller may comprise one or more modules configured to perform the functions of the controller. The or each of the modules may perform one or more functions of the controller.

According to another aspect of the present disclosure, there is provided an audio mixer comprising: an audio receiver configured to receive an audio signal comprising a plurality of audio channels; and a controller comprising one or more modules configured to: receive an audio content setting from a user interface device; adjust the relative volumes of the audio channels according to the audio content setting to provide a plurality of adjusted audio channels; and combine the adjusted audio channels to generate a custom audio content.

The audio signal may be received using a first wireless communication system.

The user interface device may be separate from the audio mixer. The user interface device may be situated remotely from the audio mixer. For example, the user interface device may be carried in the hand or kept in a pocket, bag or purse, and the audio mixer may be worn on a belt or a neck or shoulder strap or attached to, or integrally formed with, headphones.

The audio signal may comprise three or more audio channels. One or more of the audio channels may be a stereo audio channel. The custom audio content may be a stereo audio signal.

The controller may receive the audio content setting from the user interface device using a second wireless communication system. The first wireless communication system may have a longer range than the second wireless communication system.

The controller may be configured to pair with the user interface device using Bluetooth. The audio content setting may be received from the user interface device using Bluetooth communication. In other words the second wireless communication system may be Bluetooth. Alternatively, the audio content setting may be received by the audio mixer using near field communication, e.g. the second wireless communication system may be near field communication.

The audio mixer may further comprise a near field communication tag, which is readable by the user interface device. The near field communication tag may be configured to provide authorisation information to the user interface device.

The audio signal may comprise a multiplexed, e.g. encoded, audio signal. The controller may be further configured to demultiplex, e.g. decode, the received audio signal to obtain the plurality of audio channels. The audio signal may be a digitally modulated signal. The audio signal may be a digital radio signal.

The audio mixer may further comprise a microphone. The audio channels may further comprise one or more acoustic audio channels received, e.g. picked-up, by the microphone.

The controller may be further configured to: delay one or more of the adjusted audio channels prior to generating the custom audio content.

The adjusted audio channels may be delayed such that the adjusted audio channels are substantially synchronised with the acoustic audio channels, which have not been delayed, when combined within the custom audio content. The acoustic audio channels may not be delayed within the custom audio content.

The audio content setting may comprise information relating to a desired relative volume of one or more audio channels. Additionally or alternatively, the audio content setting may comprises a stereo image bias setting relating to one or more audio channels. The controller may be further configured to adjust the stereo image bias of one or more audio channels according to the audio content setting.

The audio content setting may comprise an equalisation setting relating to one or more of the audio channels. The controller may be further configured to adjust the equalisation of one or more of the audio channels according to the audio content setting. The equalisation setting may be a preset equalisation setting selected through the user interface device.

According to another aspect of the present disclosure, there is provided a system for generating a custom audio content, the system comprising: a user interface device configured to allow a user to input a desired audio content setting; and the audio mixer according to a previously mentioned aspect of the disclosure.

The system may further comprise an audio workstation, capable of creating a plurality of combined audio contents from a plurality of audio channel inputs. The relative volumes of one or more of the audio channel inputs within one or more of the combined audio contents may be different from that within the others of the audio contents.

The system may further comprise a multi-channel audio transmitter, configured to receive the combined audio contents from the audio workstation, and transmit the combined audio contents to the audio mixer, e.g. as the audio signal.

The user interface device may be a mobile telephone.

According to another aspect of the present disclosure, there is provided a method for generating a custom audio content, the method comprising: receiving an audio signal comprising one or more audio channels using a first wireless communication system; receiving an audio content setting from a user interface device; adjusting the relative volumes of the audio channels according to the audio content setting to provide one or more adjusted audio channels; and combining the adjusted audio channels to generate a custom audio content.

According to another aspect of the present disclosure, there is provided software, which when executed by a computing device, causes the computing device to perform the method according to a previously mentioned aspect of the disclosure.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

DRAWINGS

For a better understanding of the present disclosure, and to show more clearly how it may be carried into effect, reference will now be made, by way of example, to the accompanying drawings, in which.

DETAILED DESCRIPTION

Figure 1:
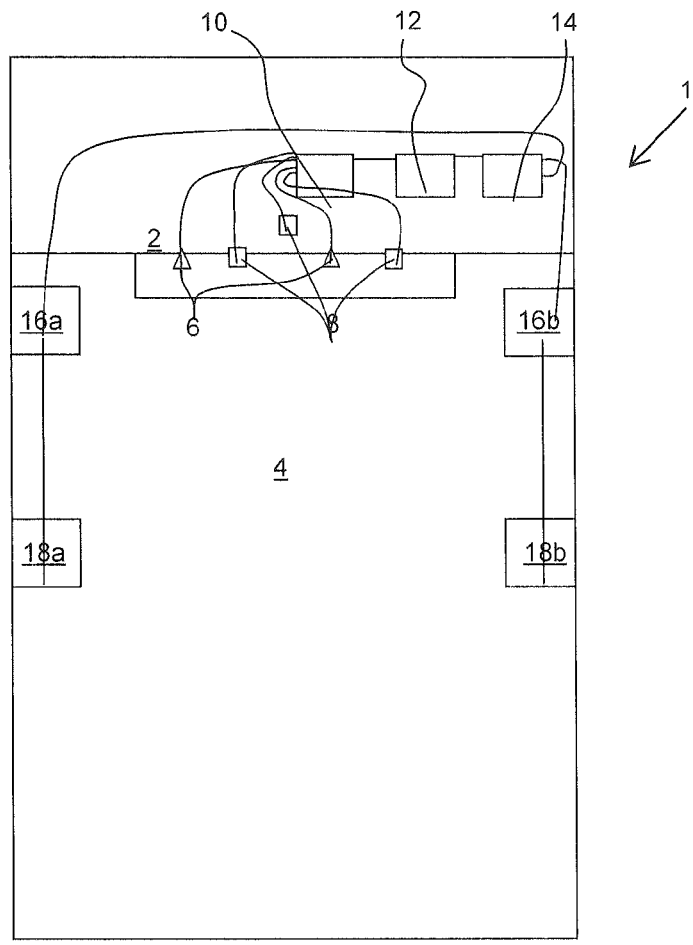
FIG. 1 is a schematic view of a previously proposed arrangement of sound recording, mixing and reproduction apparatus for a large outdoor event.

With reference to FIG. 1, a venue for a concert or other live event comprises a performance area, such as a stage 2, and an audience area 4. The audience area may comprise one or more stands of seating in a venue such as a theatre or arena. Alternatively, the audience area may be a portion of a larger area such as a park, within which it is desirable to see and/or hear a performance on the stage 2. In some cases the audience area 4 may be variable, being defined by the crowd of people gathered for the performance.

Figure 2:
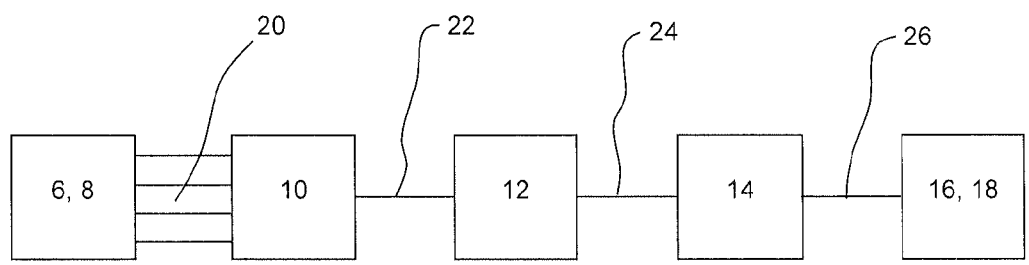
FIG. 2 is a schematic view showing the process of recording, processing and reproducing sound within the arrangement shown in FIG. 1.

With reference to FIGS. 1 and 2, the sound produced by instrumentalists and vocalists performing on the stage 2 is picked up by one or more microphone 6 and/or one or more instrument pick-ups 8 provided on the stage 2. The microphones 6 and pick-ups 8 convert the acoustic audio into a plurality of audio signals 20. The audio signals 20 from the microphones 6 and pick-ups 8 are input as audio channels into a stage mixer 10, which adjusts the relative volumes of each of the channels.

The relative volumes of each of the audio channels mixed by the stage mixer 10 are set by an audio technician prior to and/or during the performance. The relative volumes may be selected to provide what the audio technician considers to be the best mix of instrumental and vocal sounds to be projected throughout the venue. In some cases performers may request that the mix is adjusted according to their own preferences.

The mixed, e.g. combined, audio signal 22 output by the stage mixer 10 is input into a stage equaliser 12, which can be configured to increase or decrease the volumes of certain frequency ranges within the mixed audio signal. The equalisation settings may be selected by the audio technician and/or performers according to their personal tastes and may be selected according to the acoustic environment of the venue and the nature of the performance.

The mixed and equalised audio signal 24 is then input to a stage amplifier 14 which boosts the audio signal to provide an amplified signal 26, which is provided to one or more front speakers 16a, 16b to project the audio signal as sound. Additional speakers 18a, 18b are often provided within the venue to project the mixed and equalised audio to attendees located towards the back of the audience area 4. Sound from the front speakers 16a, 16b reaches audience members towards the back of the audience areas 4 a short period of time after the sound from the additional speaks 18a, 18b. In large venues, this delay may be detectable by the audience members and may lead to echoing or reverb type effects. In order to avoid such effects, the audio signal provided to the additional speakers 18a 18b is delayed before being projected into the audience area 4. The signal may be delayed by the additional speakers 18a, 18b, the stage amplifier 14, or any other component or device within the arrangement 1.

Sound from the speakers 16a, 16b and the additional speakers 18a, 18b will therefore reach an attendee towards the rear of the audience area 4 at substantially the same time, such that no reverb or echoing is noticeable.

Due to the mixed and equalised sounds being reproduced by multiple speaker systems throughout the venue, some of which are configured to delay the signal before reproducing the sound, interference may occur between the projected sounds waves in certain areas of the venue which deteriorates the quality of audible sound. For example, certain instruments and/or vocalists may become indistinguishable or inaudible within the overall sound. In addition to this, the acoustic qualities of the venue may vary according to the location within the venue and hence the equalisation of the sound may be disrupted for some audience members. For example, the bass notes may become overly emphasised.

As described above, the mix and equalisation of the sound from the performance may be set according to the personal tastes of the audio technician and/or the performers. However, the personal tastes of the individual audience members may vary from this and may vary between the audience members. For example a certain audience members may prefer a sound in which the treble notes are emphasised more than in the sound being projected from the speakers, whereas another audience member may be particularly interested in hearing the vocals of a song being performed and may prefer a mix in which the vocals are more distinctly audible over the sounds of other instruments.

Figure 3:
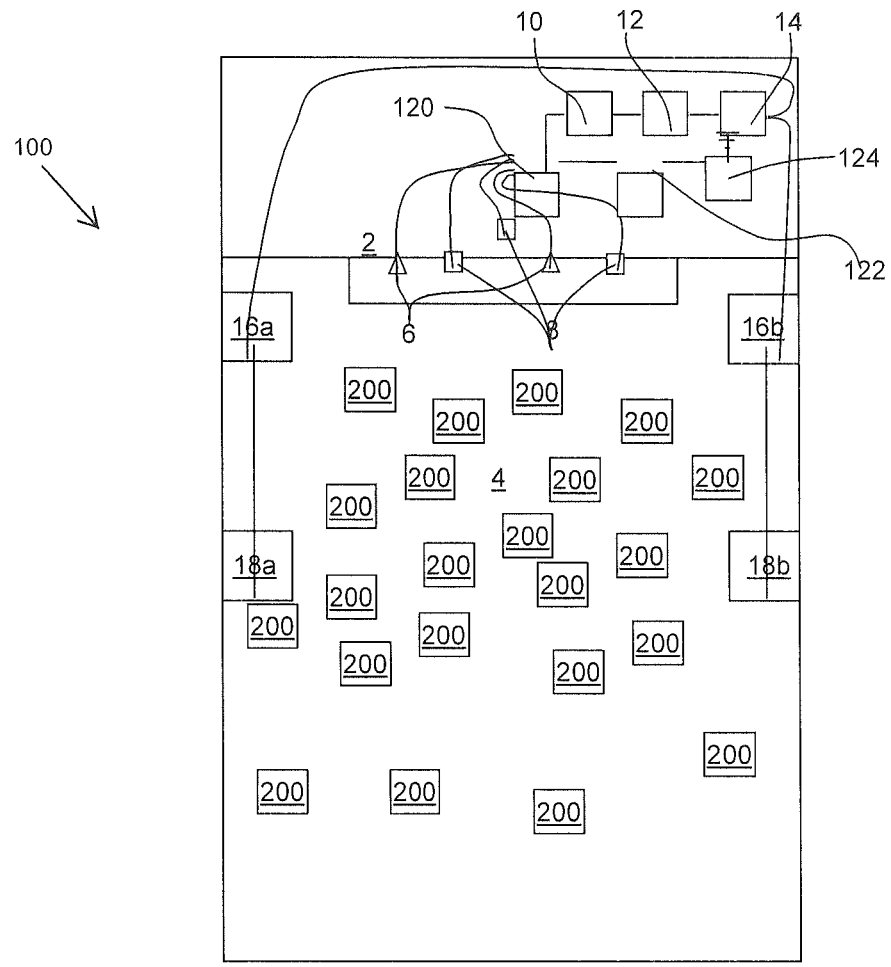
FIG. 3 is a schematic view of an arrangement of sound recording, mixing and reproduction apparatus, according to an embodiment of the present disclosure, for a large outdoor event.
Figure 4:
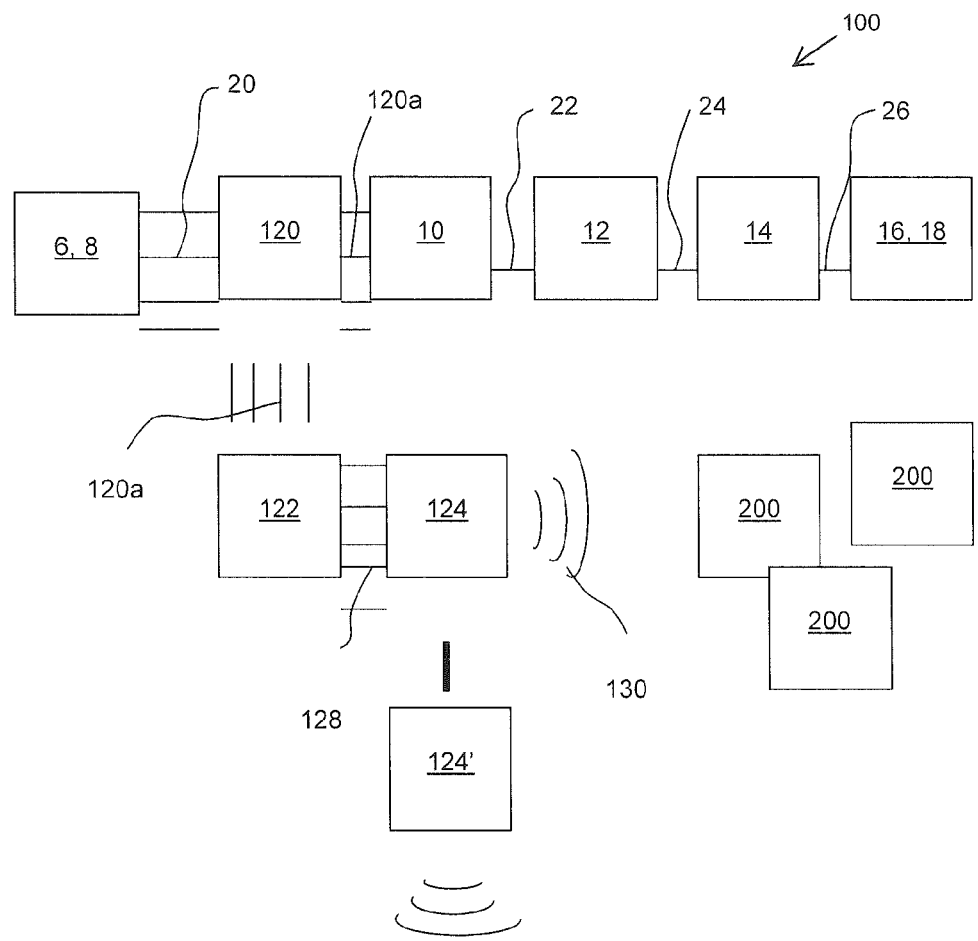
FIG. 4 is a schematic view showing the process of recording, processing and reproducing sound within the arrangement shown in FIG. 3.

With reference to FIGS. 3 and 4, in order to provide an improved quality and consistency of audio experienced by each audience member attending a performance and to allow the mix and equalisation of the audio to be individually adjusted by each audience member, an arrangement 100 of sound recording, mixing and reproduction apparatus, according to an embodiment of the present disclosure, is provided. The apparatus within the arrangement 100 is configured to record, mix and reproduce audio signals following a process.

The arrangement 100 comprises the microphones 6, instrument pick-ups 8, stage mixer 10, stage equaliser 12 and stage amplifier 14, which provide audio signals to drive the front speakers 16a, 16b and additional speakers 18a, 18b as described above with reference to the arrangement 1. The arrangement 100 further comprises a stage audio splitter 120, an audio workstation 122, a multi-channel transmitter 124 and a plurality of personal audio mixing devices 200.

The stage audio splitter 120 is configured to receive the audio signals 20 from each of the microphones 6 and instrument pick-ups 8, and split the signals to provide inputs 120a to the stage mixer 10 and the audio workstation 122. The inputs 120a received by the stage mixer 10 and the audio workstation 122 are substantially the same as each other, and are substantially the same as the input 20 received by the stage mixer 10 in the arrangement 1, described above. This allows the stage mixer 10 and components which receive their input from the stage mixer 10 to operate as described above.

The audio workstation 122 comprises one or more additional audio splitting and mixing devices, which are configured such that each mixing device is capable of outputting a combined audio signal 128 comprising a different mix of each of the audio channels 120a, e.g. the relative volumes of each of the audio signals 120a within each one or the combined audio signals 128 are different to within each of the other combined audio signals 128 output by the other mixing devices. The audio workstation 122 may comprise a computing device, or any other system capable of processing the audio signal inputs 120a from the stage audio splitter 120 to generate the plurality of combined audio signals 128.

The combined audio signals 128 output by the audio workstation 122 are input to a multi-channel audio transmitter 124. The multi-channel audio transmitter 124 is configured to transmit the combined audio signals 128 as one or more wireless signals 130 using wireless communication, such as radio, digital radio, Wi-Fi, or any other wireless communication method. The multi-channel audio transmitter 124 is also capable of relaying the combined audio signal to one or more further multi-channel audio transmitters 124' using a wired or wireless communication method. Relaying the combined audio signals allows the area over which the combined audio signal is transmitted to be extended.

Each of the combined audio signals 128 may be transmitted separately using a separate wireless communication channel, bandwidth, or frequency. Alternatively, the combined audio signals 128 may be multiplexed together and transmitted using a single communication channel, bandwidth or frequency. For example, the combined audio signals 128 may be encoded using a Quadrature Amplitude Modulation (QAM) technique, such as 16-bit QAM. The wireless signals 130 transmitted by the multi-channel audio transmitter 124 are received by the plurality of personal audio mixing devices 200.

Figure 5:
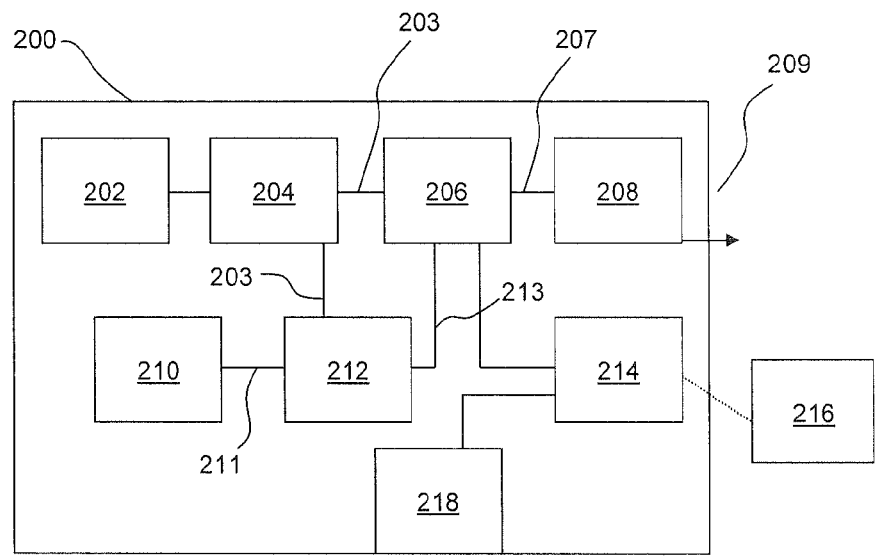
FIG. 5 is a schematic view of a system for mixing a custom audio content according to an embodiment of the present disclosure.

With reference to FIG. 5, the personal audio mixing devices 200, according to an embodiment of the present disclosure, comprises an audio signal receiver 202, a decoder 204, a personal mixer 206, and a personal equaliser 208.

The audio signal receiver 202 is configured to receive the wireless signal 130 comprising the combined audio signals 128 transmitted by the multi-channel transmitter 124. As described above, the multi-channel transmitter 124 may encode the signal, for example using a QAM technique. Hence, the decoder 204 may be configured to demultiplex and/or demodulate, e.g. decode, the received signal as necessary to recover each of the combined audio signals 128, as one or more decoded audio signals 203.

As described above, the combined audio signals 128 each comprise a different mix of audio channels 20 recorded from the instrumentalists and/or vocalists performing on the stage 2. For example, a first combined audio signal may comprise a mix of audio channels in which the volume of the vocals has been increased with respect to the other audio channels 20; in a second combined audio signal the volume of an audio channel from the instrument pick-up of a lead guitarist may be increased with respect to the other audio channels 20. The decoded audio signals 203 are provided as inputs to the personal mixer 206.

The personal mixer 206 may be configured to vary the relative volumes of each of the decoded audio signals 203. The mix created by the personal mixer 206 may be selectively controlled by a user of the personal audio mixer device 200, as described below. The user may set the personal mixer 206 to create a mix of one or more of the decoded audio signals 203, e.g. a mix of one or more of the combined audio signals 128.

In a particular arrangement, each of the combined audio signals 128 is mixed by the audio workstation 122 such that each signal comprises a single audio channel 20 recorded from one microphone 6 or instrument pick-up 8. The personal mixer 206 can therefore be configured by the user to provide a unique personalised mix of audio from the performers on the stage 2.

The personal mixer 206 may also be configured to adjust, e.g. bias, the stereo image of one, several or each of the decoded audio signals. Adjusting the stereo image of an audio channel may provided an improved listening experience for the user of the personal audio mixing device 200. The stereo image of the audio signals may be configured to correspond to a spatial location of the audio source, e.g. the performer, such that the performer being heard by a user can be located on the stage 2.

A mixed audio signal 207 output from the personal mixer 206 is processed by a personal equaliser 208. The personal equaliser 208 is similar to the stage equaliser 12 described above and allows the volumes of certain frequency ranges within the mixed audio signal 207 to be increased or decreased. The personal equaliser 208 may be configured by the user of the personal audio mixer device 200 according to their own listening preferences.

An equalised audio signal 209 from the personal equaliser 208 is output from the personal mixer device 200 and may be converted to sound, e.g. by a set of personal head phones or speakers (not shown), allowing the user, or a group of users to listen to the personal audio content created on the personal audio mixing device 200.

Each member of the audience may use their own personal audio mixing device 200 to listen to a personal, custom audio content at the same time as listening to the stage mix being projected by the speakers 16 and additional speakers 18. The pure audio reproduction of the performance provided by the personal audio mixing device 200 may be configured as desired by the user to complement or augment the sound being heard from the speaker systems 16, 18, whilst retaining the unique experience of the live event.

If desirable, the user may listen to the personal, custom audio content in a way that excludes other external noises, for example by using noise cancelling and/or noise excluding headphones.

In order for the user of the personal audio mixing device 200 to configure the personal mixer 206 and personal equaliser 208 according to their preferences, the personal audio mixing device 200 may comprise one or more user input devices, such as buttons, scroll wheels, or touch screen devices (not shown). Additionally or alternatively, the personal audio mixing device 200 may comprise a user interface communication module 214.

As shown in FIG. 5, the user interface communication module 214 is configured to communicate with a user interface device 216. The user interface device 216 may comprise any portable computing device capable of receiving input from a user and communicating with the user interface communication module 214. For example, the user interface device 216 may be a mobile telephone or tablet computer. The user interface communication module 214 may communicate with the user interface device 216 using any form of wired or wireless communication methods. For example, the user interface communication module 214 may comprise a Bluetooth communication module and may be configured to couple with, e.g. tether to, the user interface device 216 using Bluetooth.

The user interface device 216 may run specific software, such as an app, which provides the user with a suitable user interface, such as a graphical user interface, allowing the user to easily adjust the settings of the personal mixer 206 and personal equaliser 208. The user interface device 216 communicates with the personal audio mixer device 200 via the interface communication module 214 to communicate any audio content settings which have been input by the user using the user interface device.

Audio content settings communication by the user interface device 216 may comprise settings relating to desired relative volumes, e.g. mix, of one or more of the decoded audio channels. Additionally or alternatively, the audio content setting may comprise settings relating a desired stereo image bias of one or more of the decoded audio channels. Again, additionally or alternatively, the audio content setting may comprise settings relating to desired equalisation of one or more of the decoded audio channels.

The mix, stereo imaging, and/or equalisation settings may be configured manually by the user through the user interface provided by the user interface device 216. Alternatively, the user may select a preset mix, stereo imaging, and/or equalisation setting provided though the user interface. The preset settings may be provided according to the performance and/or venue the user is attending.

The user interface device 216 and the personal audio mixing device 200 may communicate in real time to allow the user to adjust the mix, stereo image and equalisation of the audio delivered by the personal audio mixing device 200 during the concert. For example, the user may wish to adjust the audio content settings according to the performer or the stage on which a specific song is being performed.

The personal audio mixer device 200 also comprises a Near Field Communication (NFC) module 218. The NFC module 218 may comprise an NFC tag which can be read by an NFC reader provided on the using interface device 216. The NFC tag may comprise authorisation data which can be read by the user interface device 216, to allow the user interface device 216 to couple with the personal audio mixing device 200, e.g. with the user interface communication module 214. Additionally or alternatively, the authorisation data may be used by the user interface device 216 to access another service provided at the performance venue.

The NFC module 218 may further comprise an NFC radio. The radio may be configured to communicate with the user interface device 216 to receive an audio content setting from the user interface device 216. Alternatively, the NFC radio may read an audio content setting from another source such as an NFC tag provided on a concert ticket, or smart poster at the venue.

The personal audio mixer device 200 further comprises a microphone 210. The microphone 210 may be a single channel microphone. Alternatively the microphone 210 may be a stereo or binaural microphone. The microphone 210 is configured to record the acoustic sound at the location of the user, for example the microphone 210 may record the sound of the crowd and the sound received by the user from the speakers 16 and additional speakers 18. The sound is converted by the microphone 210 to an acoustic audio channel 211, which is input to the personal mixer 206. The user of the personal audio mixing device 200 can adjust the relative volume of the acoustic audio channel 211 together with the decoded audio signals 203. This may allow the user of the device 200 to continue experiencing the sound of the crowd at a desired volume whilst listening to the personal audio mix created on the personal audio mixing device 200.

Prior to being input to the personal mixer 206, the acoustic sound channel 211 is input to an audio processor 212. The audio processor 212 also receives the decoded audio channels from the decoder 204. The audio processor 212 analyses the waveform of the acoustic signal and the decoded audio channels to determine a delay between the acoustic audio signal 211 recorded by the microphone 210 and the decoded audio channels 203 received from the multi-channel transmitter 124. The audio processor 212 may consider each of the decoded audio signals 203 in order to determine the delay. Alternatively, the audio processor 212 may consider a particular decoded audio channel 203, for example one which corresponds to the mix of audio signals being projected by the speakers 16 and additional speakers 18. The audio processor 212 may delay one, some or each of the decoded audio channels 203 by the determined delay and may input one or more delayed audio channels 213 to the personal mixer 206. This allows the personal audio content being created on the personal audio mixer device 200 to be synchronised with the sounds being heard by the user from the speakers 16 and additional speakers 18.

It will be appreciated that the personal audio mixing device 200 may comprise one or more controllers configured to perform the functions of one or more of the audio signal receiver 202, the decoder 204, the personal mixer 206, the personal equaliser 208, the user interface communication module 214 and the audio processor 212, as described above. The controllers may comprise one or more modules. Each of the modules may be configured to perform the functionality of one of the above-mentioned components of the personal audio mixing device 200. Alternatively, the functionality of one or more of the components mentioned above may be split between the modules or between the controllers. Furthermore, the or each of the modules may be mounted in a common housing or casing, or may be distributed between two or more housings or casings.

Although the disclosure has been described by way of example, with reference to one or more examples, it is not limited to the disclosed examples and other examples may be created without departing from the scope of the disclosure, as defined by the appended claims.

What is claimed is:

1. A personal audio mixer adapted to be worn or carried by the user, the audio mixer comprising:
   an audio receiver configured to receive an audio signal comprising a plurality of audio channels using a first wireless communication system; and
   a controller configured to:
      receive an audio content setting from a user interface device separate from the audio mixer, wherein the audio content setting includes a stereo image bias setting relating to one or more of the plurality of audio channels;
      adjust the stereo image bias of the audio channels to correspond to a spatial location of an audio source relative to the user and the relative volumes of at least some of the plurality of audio channels of the received audio signal according to the audio content setting to provide a plurality of adjusted audio channels; and
      combine the adjusted audio channels to generate a custom audio content.

2. The audio mixer of claim 1, wherein the controller receives the audio content setting from the user interface device using a second wireless communication system.

3. The audio mixer of claim 2, wherein the first wireless communication system has a longer range than the second wireless communication system.

4. The audio mixer of claim 1, wherein the controller is configured to pair with the user interface device using Bluetooth; and
   wherein the audio content setting is received from the user interface device using Bluetooth communication.

5. The audio mixer of claim 1, wherein the audio content setting is received by the audio mixer using near field communication.

6. The audio mixer of claim 1, wherein the audio receiver and the controller are provided within a single housing.

7. The audio mixer of claim 1, wherein the audio mixer further comprises a near field communication tag readable by the user interface device.

8. The audio mixer of claim 7, wherein the near field communication tag is configured to provide authorization information to the user interface device.

9. The audio mixer of claim 1, wherein the audio signal comprises a multiplexed audio signal; and
   wherein the controller is further configured to demultiplex the received audio signal to obtain the plurality of audio channels.

10. The audio mixer of claim 1, wherein the audio signal is a digitally modulated signal.

11. The audio mixer of claim 1 further comprising a microphone, wherein the audio channels further comprise one or more acoustic audio channels received by the microphone.

12. The audio mixer of claim 1, wherein the controller is further configured to:
   delay one or more of the adjusted audio channels prior to generating the custom audio content.

13. The audio mixer of claim 1, wherein the adjusted audio channels are delayed such that the adjusted audio channels are substantially synchronized with the acoustic audio channels, which have not been delayed.

14. The audio mixer of claim 1, wherein the audio content setting comprises information relating to a desired relative volume of one or more audio channels.

15. The audio mixer of claim 1, wherein the audio content setting comprises an equalization setting relating to one or more of the audio channels; and
   wherein the controller is further configured to adjust the equalization of one or more of the audio channels according to the audio content setting.

16. The audio mixer of claim 15, wherein the equalization setting is a preset equalization setting selected through the user interface device.

17. A system for generating a custom audio content, the system comprising:
   a user interface device configured to allow a user to input a desired audio content setting; and
   the audio mixer according to claim 1.

18. The system according to claim 17 further comprising:
   an audio workstation, capable of creating a plurality of combined audio contents from a plurality of audio channel inputs, wherein the relative volumes of one or more of the audio channel inputs within one or more of the combined audio contents are different from that within the others of the audio contents.

19. The system of claim 18 further comprising:
   a multi-channel audio transmitter, configured to receive the combined audio contents from the audio workstation, and transmit the combined audio contents to the audio mixer.

20. The system of claim 17, wherein the user interface device is a mobile telephone.

21. A method for generating a custom audio content using a personal audio mixer, the method comprising:
   receiving an audio signal comprising one or more audio channels;
   receiving an audio content setting from a user interface device separate from the audio mixer, wherein the audio content setting includes a stereo image bias setting relating to one or more of the plurality of audio channels;

adjusting the stereo image bias of the audio channels to correspond to a spatial location of an audio source relative to the user and the relative volumes of at least some of the plurality of audio channels of the received audio signal according to the audio content setting to provide one or more adjusted audio channels; and combining the adjusted audio channels to generate a custom audio content.

\* \* \* \* \*